United States Patent
Baumgartner

[11] Patent Number: 5,841,094
[45] Date of Patent: Nov. 24, 1998

[54] METHOD AND APPARATUS FOR RESISTANCE WELDING COATED SHEET METAL

[75] Inventor: Michael Baumgartner, Rekingen, Switzerland

[73] Assignee: Elpatronic AG, Zug, Switzerland

[21] Appl. No.: 692,011

[22] Filed: Aug. 2, 1996

[30] Foreign Application Priority Data

Aug. 9, 1995 [CH] Switzerland ............... 02-291/95

[51] Int. Cl.[6] ............ B23K 11/06; B23K 11/24
[52] U.S. Cl. ............ 219/81; 219/64; 219/83; 219/110
[58] Field of Search .............. 219/61.5, 67, 81, 219/83, 110, 118, 64

[56] References Cited

U.S. PATENT DOCUMENTS

| | | |
|---|---|---|
| 3,610,862 | 10/1971 | Erlandson . |
| 4,160,892 | 7/1979 | Opprechet et al. . |
| 4,404,447 | 9/1983 | Kitamura et al. ............ 219/64 |
| 4,652,714 | 3/1987 | Mergey et al. ............ 219/64 |
| 4,732,026 | 3/1988 | Ban ............ 219/83 |

FOREIGN PATENT DOCUMENTS

| | | |
|---|---|---|
| 0 547 322 A1 | 6/1993 | European Pat. Off. . |
| 0 622 148 A1 | 11/1994 | European Pat. Off. . |
| 2 178 682 | 2/1987 | United Kingdom . |

OTHER PUBLICATIONS

Patent Abstracts of Japan; vol. 005, No. 132 (C–068), 22. Aug. 1981 & JP–A–56 065995 (Kawaski Steel Corp), 4. Jun. 1981.

*Primary Examiner*—Gregory L. Mills
*Attorney, Agent, or Firm*—McCormick, Paulding & Huber

[57] ABSTRACT

For welding sheet-metal blanks coated with electrically conductive material, the thickness of the coating is measured with a measurement device. The welding current source controls the welding current I as a function of the film thickness reading obtained, to keep the power input into the weld zone essentially constant.

9 Claims, 2 Drawing Sheets

METHOD AND APPARATUS FOR RESISTANCE WELDING COATED SHEET METAL

BACKGROUND OF THE INVENTION

The invention relates to a method for electrical resistance welding, by means of a roller seam welding machine, of sheet metal which has been provided with an electrically conductive coating, in particular for welding can bodies. The invention also relates to an apparatus for carrying out the method.

For coated sheet-metal blanks which are welded, the thickness of the electrically conductive coating may have a considerable influence on weld quality. Particularly when tinplate is welded to form cans, it has been found that there may be relatively large variation in the thickness of the tin layer on the LTS (low tinning) sheets employed. Measurements on coils of this material have revealed that the thickness of the tin layer, for a required deposition of 1 g/m$^2$, may vary by up to approximately 3.0 g/m$^2$ over the coil width of approximately 900 mm. High readings occur chiefly at the margins of the coil. When an overlapping seam is formed for roller seam welding, the number of tin layers which come between the welding electrodes is four, so that the thickness of the tin layers may have a considerable influence on the resultant weld, as welding is usually carried out with a constant welding current produced by suitably controllable, known constant-current welding power sources. The fluctuating electrical resistance of the overlapping seam of sheet-metal blanks with tin coatings of varying thickness causes fluctuation of the power input into the weld zone, which is inimical to good weld quality. The same is true for other coated sheet metal besides tinplate.

SUMMARY OF THE INVENTION

The object which lies at the basis of the invention is to provide a welding method which does not have this drawback. This is achieved in a method of the kind stated above by determining the thickness of the coating of the workpiece on at least one side thereof upstream of the welding zone, while the welding machine is in operation, and by controlling the welding current source of the welding machine during the welding operation in dependence upon the coating thickness ascertained, in order to keep the power input into the weld zone closer to a desired value.

By ascertaining the coating thickness or the amount of coating material present on the blank it is possible to influence the welding current source as the blank is welded, varying the welding current according to the coating thickness, so that the power input is kept constant; hence the welding current is matched in an ongoing manner to the contact resistance likely to be encountered owing to the coating thickness. A thicker coating generally yields a lower contact resistance (although conditions could be reversed depending on the coating material) and requires a higher current, as otherwise cold welding is likely to result. Modern welding current sources (eg. of the UNISOUD type supplied by Soudronic of Switzerland) presently operate with constant current but tolerate a rapidly fluctuating welding current, so that a sufficiently rapid response can be made to variations in coating thickness during welding.

BRIEF DESCRIPTION OF THE DRAWINGS

Examples of particular ways of carrying out the invention will now be described in detail with reference to the drawings, in which.

DESCRIPTION OF THE PREFERRED EMBODIMENTS

Figure 1:
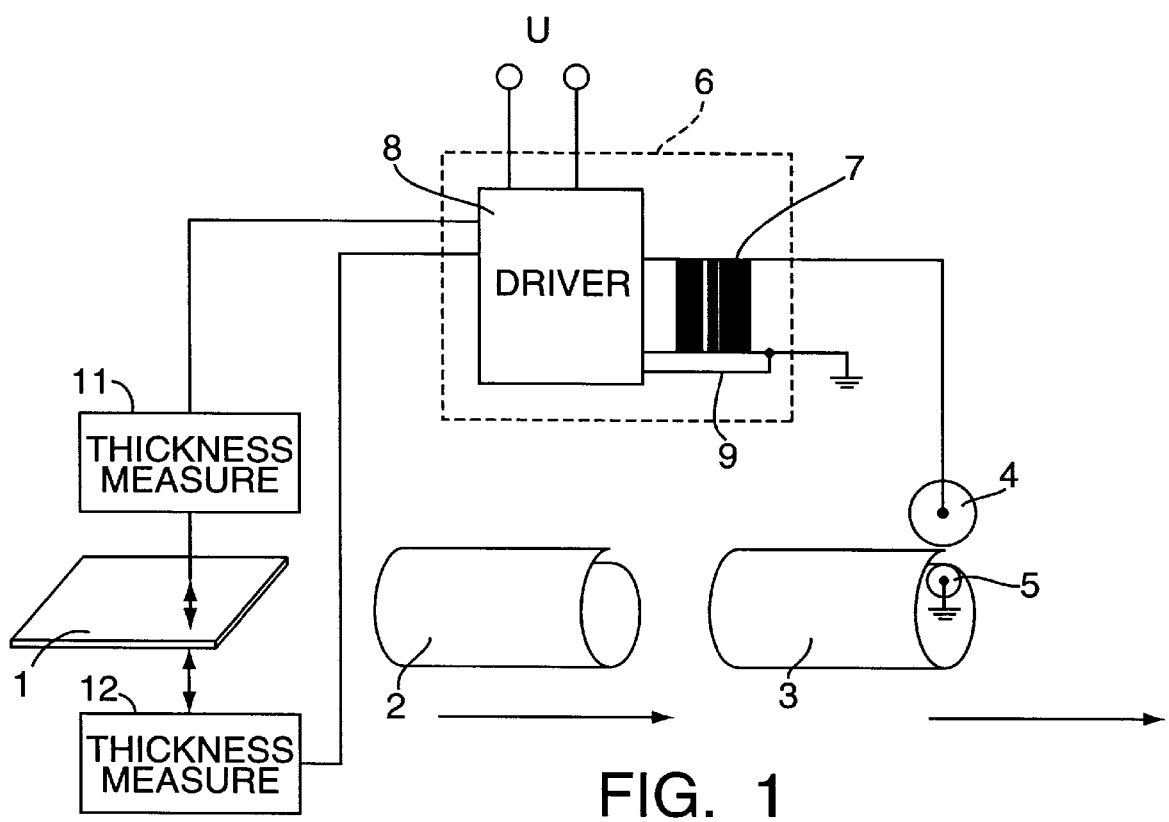
FIG. 1 shows in highly schematic form the method of operation according to the invention for the welding of cans.

FIG. 1 shows in highly schematic form the sequence of the method according to the invention applied to the welding of can bodies. To weld can bodies, a flat sheet-metal blank 1 is formed into a cylindrical body 2 in a rounding unit. This formed body, which usually has an overlap which is welded in a roller seam welding machine to form an overlapping seam, is designated 3 in the figure. The seam is welded between the upper electrode 4 and the lower electrode 5 of the roller seam welding machine. Wire electrodes are generally employed: these pass over the rollers shown at 4 and 5, but are not themselves shown in the figure. Welding current to produce the welded seam is supplied by a welding current source 6. This comprises a welding transformer and a driver 8 for the welding transformer. From a supply voltage U the driver 8 provides a primary voltage with a frequency of eg. 500 Hz for the welding transformer.

Usually a constant welding current I is established by a current feedback from the secondary side of the transformer 7 to the driver 8, which has a corresponding regulator. However, if the thickness of the coating of the sheet-metal blanks 1 varies within a blank, or from one blank to another, the constant welding current I results in a varying power input into the weld zone, and hence in uneven weld quality. In accordance with the invention, the thickness of the coating of the blank 1 is now measured while the machine is in operation and the welding current is varied according to the thickness of the coating. In the schematic illustration of FIG. 1, a measurement device 11 is provided for this purpose. This measures the film thickness of the coating on the sheet-metal blank 1. The result obtained is transmitted to the welding current source 6, which adjusts the welding current to suit the film thickness reading when the blank 1 concerned has arrived at the welding rollers 4 and 5. The film thickness may be determined by the measurement device 11 on one side of the blank only. Alternatively, a second measurement device 12 may be provided on the other side of the blank to measure the thickness of the coating on that side also.

The blanks may be coated sheet-metal blanks of the widest variety of types. In the particular application shown, ie. the welding of can bodies, they are generally tinplate, ie. sheet steel which is provided with a layer of tin, usually on both sides. The film thickness is measured preferably in the region of the blank which forms the weld zone after the blank is rounded to form a can body. Instead of performing the measurement when the blank is in the flat condition, it is of course also possible to determine the film thickness after the blank has been rounded.

To carry out the method, the welding current source 6 is provided with at least one input to which the reading obtained by the thickness measurement device 11 can be fed. This reading is then used to vary the welding current according to the measured thickness, eg. by assigning to a given measured thickness a welding current set value I which is then maintained by the welding current source. If a second thickness measurement device 12 is provided, the signal output by this device is also used for control purposes eg. by being combined with the signal output by the first thickness measurement device 11. Preferably, the measurement of the thickness, whether in a continuous manner or at a series of measurement points in each blank, and the adaptation of the welding current I is carried out with sufficient rapidity to be able to compensate for variations in coating thickness within an individual can body or blank by varying the welding current. Alternatively, the current may be only set for each blank on the basis of one or more measurements of the coating thickness on the blank to establish a value that is effective for the complete course of the weld on that blank, so that the current level does not vary within the welded seam of that blank. In this way, more uniform welds can be obtained on a series of blanks which each have a generally uniform coating but in which the coating varies from blank to blank. Blanks from the margin of the coil often have thicker tinning than blanks from the middle of the coil.

With conventional welding methods, the result of mixing such blanks with blanks from the middle of the coil is cold welding in the region of the thicker tin layer, as contact resistance is lower. By using the welding method according to the two variations indicated, every blank (ie. every body) can be welded with the appropriate current, and/or the current can be varied within a given body, to ensure optimum welding.

Figure 2:
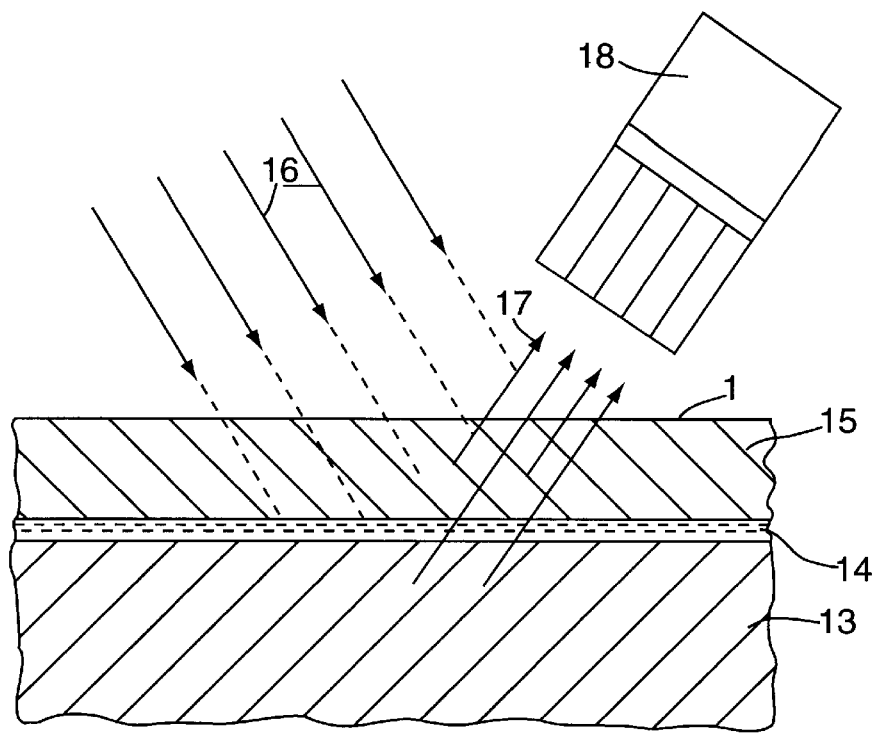
FIG. 2 illustrates in highly schematic form a measurement technique for determining the thickness of the coating.

FIG. 2 shows schematically an example of coating thickness measurement on a tinplate blank 1. A portion of the blank is shown in vertical section; it consists of a steel sheet 13 which is provided with a tin coating 15, at least on one side, and usually on both sides. An iron/tin intermediate layer 14 forms between the steel sheet and the tin coating. When the surface of the blank 1 is irradiated with high-energy electromagnetic waves (X-rays or gamma rays), a characteristic radiation of the steel and tin layer is excited. In FIG. 2, gamma radiation is indicated as radiation 16. The characteristic radiation of the steel and tin is represented as radiation 17 which is picked up and analysed by a radiation receiver 18. The result of the analysis is transmitted to the welding current source, as shown in FIG. 1. Such measurement devices are known in themselves, and are also used by manufacturers of coated metal sheets to control and monitor tin deposition. Measurement of the tin coating on steel generally uses high-energy iron-K-alpha radiation as the characteristic radiation 17, which is attenuated by fluctuations in the tin film thickness in a varying but specific manner, so that the attenuation of the iron-K-alpha radiation by the tin coating serves as a measure of its film thickness.

Figure 3:
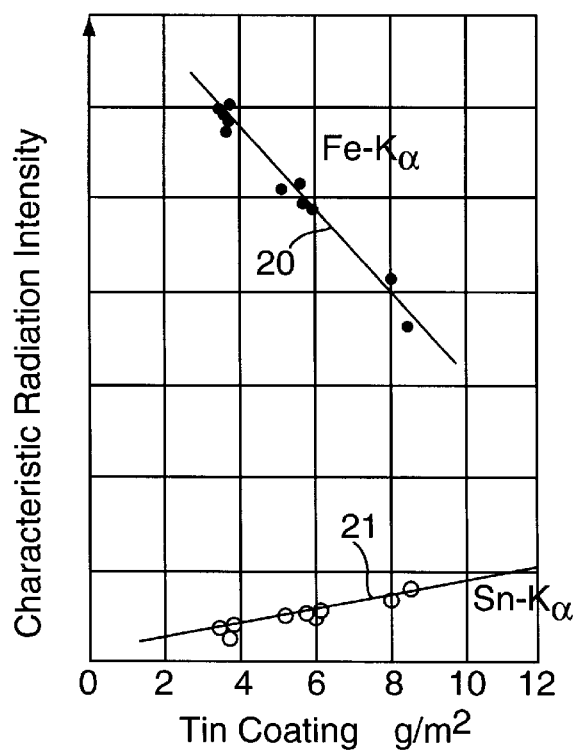
FIG. 3 is a representation of the characteristic radiation intensity curves obtained by the radiation measurement technique.

FIG. 3 is a graph which plots the characteristic radiation intensity both for iron-K-alpha radiation 20 and for tin-K-alpha radiation 21 against the thickness of the tin coating on the sheet metal. It is clearly apparent from the graph that the tin deposition can be determined precisely by measuring the characteristic radiation intensity 20.

Instead of measuring the thickness of the coating by a radiation measurement system, other measurement techniques can of course be used. For instance, the thickness of a coating can be determined from magnetic or electrical parameters of the coated sheet metal. The most suitable technique for the particular case may be chosen from among the appropriate known techniques for the individual coating concerned.

I claim:

1. Method for electrical resistance welding, by means of a roller seam welding machine, of sheet metal provided with an electrically conductive coating, characterized in that a thickness of the coating of the sheet metal on at least one side thereof is determined upstream of a welding zone, while the welding machine is in operation, and in that a welding current source of the welding machine is controlled during a welding operation in dependence upon the coating thickness ascertained, in order to keep power input into the welding zone essentially constant.

2. Method according to claim 1, characterised in that the thickness of the coating is determined in a region of an intended weld seam.

3. Method according to claim 1, characterised in that the sheet metal welded is tinplate and the thickness of its tin layer is determined.

4. Method according to claim 1, characterised in that the thickness of the coating is determined by a radiation measurement technique.

5. Method according to claim 4, characterised in that characteristic radiation of a substrate material under the coating is measured by irradiation thereof with gamma rays.

6. Method according to claim 1 characterised in that the coating thickness is determined from at least one of electrical and magnetic parameters.

7. Method according to claim 1, characterised in that the thickness of the coating is determined in a region of an intended weld seam on both sides of the sheet metal.

8. Apparatus for electrical resistance welding of sheet metal provided with an electrically conductive coating, characterised by a roller seam welding machine with a controllable welding current source supplying welding current for welding the sheet metal, a detection device for detecting the coating thickness and producing an output signal in accordance with the detected thickness, and a controlling or regulating element connected to the detection device and with the welding current source for derving a control signal from the output signal of the coating thickness detection device and setting the welding current supplied by the controllable welding current source.

9. Apparatus according to claim 8, characterised in that the detection device for detecting the thickness of the coating comprises a gamma ray source and a detector of alpha radiation.

* * * * *